(12) United States Patent  
Webb

(10) Patent No.: US 6,686,707 B1
(45) Date of Patent: Feb. 3, 2004

(54) METHOD AND APPARATUS FOR PROVIDING A DYNAMIC ROTATIONAL ALIGNMENT OF A CATHODE RAY TUBE RASTER

(75) Inventor: James R. Webb, Longmont, CO (US)

(73) Assignee: Genesis Microchip Inc., Alviso, CA (US)

( * ) Notice: Subject to any disclaimer, the term of this patent is extended or adjusted under 35 U.S.C. 154(b) by 0 days.

(21) Appl. No.: 10/248,660

(22) Filed: Feb. 5, 2003

Related U.S. Application Data

(60) Provisional application No. 60/403,833, filed on Aug. 14, 2002.

(51) Int. Cl.[7] .................................................. G09G 1/04
(52) U.S. Cl. .................. 315/364; 315/368.26; 315/370; 313/413; 348/807
(58) Field of Search ............................ 315/364, 368.26, 315/368.11, 368.25, 370; 313/413, 412; 335/210, 213, 212; 348/806, 805, 807

(56) References Cited

U.S. PATENT DOCUMENTS

| | | | |
|---|---|---|---|
| 4,388,619 A | * 6/1983 | Beck | 315/371 |
| 4,638,308 A | 1/1987 | Kuwabara et al. | 340/736 |
| 4,926,098 A | 5/1990 | Tarrillo | 315/408 |
| 4,956,585 A | 9/1990 | Rilly | 315/371 |
| 5,117,151 A | * 5/1992 | Sluyterman et al. | 313/413 |
| 5,248,920 A | * 9/1993 | Gioia et al. | 315/368.26 |
| 5,349,274 A | 9/1994 | Watanabe et al. | 315/395 |
| 5,663,615 A | 9/1997 | Ogino | 315/371 |
| 5,825,414 A | 10/1998 | Webb et al. | 348/180 |
| 5,896,170 A | 4/1999 | Webb et al. | 348/190 |
| 5,969,486 A | 10/1999 | Webb et al. | 315/384 |
| 6,014,168 A | 1/2000 | Webb et al. | 348/190 |
| 6,437,829 B1 | * 8/2002 | Webb et al. | 348/476 |
| 6,480,406 B1 | 11/2002 | Jin et al. | 365/49 |
| 6,492,853 B1 | 12/2002 | Latham et al. | 327/199 |

* cited by examiner

Primary Examiner—James Clinger
Assistant Examiner—Ephrem Alemu
(74) Attorney, Agent, or Firm—Beyer Weaver & Thomas LLP

(57) ABSTRACT

A method and apparatus used to step and correct the position of raster lines in a sinusoidal or zig-zag deflection system. By combining the magnetic flux generated with a rotation "twister" coil and a vertical deflection coil, scan lines can be uniformly spaced and separated nearly to their ends. Accordingly, the magnetic flux generated with the twister coil is adjusted going in the left to right direction then reversed in polarity and readjusted while returning from right to left. It is this controlled twister flux that combines with the linear vertical deflection flux to straighten and then step each scan line to produce an aligned raster.

15 Claims, 15 Drawing Sheets resulting raster

METHOD AND APPARATUS FOR PROVIDING A DYNAMIC ROTATIONAL ALIGNMENT OF A CATHODE RAY TUBE RASTER

CROSS REFERENCE TO RELATED APPLICATIONS

This application takes priority under 35 U.S.C. §119 (e) of U.S. Provisional Patent Application No. 60/403,833 entitled "Method and Apparatus for Providing a Dynamic Rotational Alignment of a Cathode Ray Tube Raster" by Webb filed Aug. 14, 2002 which is incorporated by reference in its entirety for all purposes.

BACKGROUND OF THE INVENTION

1. Field of the Invention

The invention relates to cathode ray tube displays. More specifically, the invention describes a method and apparatus for generating a dynamic rotation field to precisely align raster scan lines displayed on a cathode ray tube. The invention is of significant interest in low and very low power sinusoidal, wide and very wide angle deflection systems, as well as DTV, HDTV and VHDTV, and other high and very high resolution video displays.

2. Definitions

To align is to cause a video image to be adjusted so that distortion characteristics are minimized and the video image that is displayed on the cathode ray tube forms an image that is pleasing to the eye.

A cathode ray tube refers to the tube structure, the phosphor screen, the neck of the tube, the deflection and control windings, including the yoke, rotation and other coils, and the electron guns.

Coordinate locations are discrete physical locations on the face of the cathode ray tube, or a physical area on the CRT screen.

Correction and driver circuitry are one or more of the following: digital to analog converters, interpolation engine, pulse width modulators and pulse density modulators, as well as summing amplifiers, oscillators, op-amps, inverters comparators or any other components necessary to produce and condition correction signals to synchronously apply to control circuitry to generate an aligned video image.

Correction control signals are correction factor signals that have been combined in a manner to be applied to either horizontal control circuitry, vertical control circuitry, coils, or electron gun circuitry.

Correction factor data includes the encoded digital bytes or any other form of data, such as term multipliers that adjust standardized transformation equations, that are representative of the amount of correction required to align a video signal at a particular physical location on a cathode ray tube to counteract distortion characteristics at that location. Correction factor data may include data from the gain matrix table, data relating to electron gun characteristics and/or data relating to geometry characteristics of the cathode ray tube.

Correction factor parameters include various geometry characteristics of the cathode ray tube including horizontal size, raster rotation, vertical size, horizontal center, vertical center, pin cushioning, vertical linearity, keystoning, convergence, etc., and various electron gun characteristics of the cathode ray tube including contrast, brightness, luminosity, focus, color balance, color temperature, electron gun cutoff, etc.

Correction factor signals are digital correction signals that have been integrated or filtered.

Correction signals are digital correction signals and correction factor signals.

A decoder is a device for generating an electronic signal in response to one or more data bytes that may include PWMs, PDMs, DACs, interpolation engines, on screen display chips, etc.

A deflection yoke is primarily two coils: a horizontal and a vertical coil—designating horizontal or vertical deflection of the electron beam through the CRT. Of these coils the major power consumer is the horizontal coil because it is driven at a high horizontal scan frequency, whereas the vertical coil is driven at the lower vertical scan frequency. Other coils may also deflect, rotate or reshape the electron beam or beams and be incorporated within the Deflection Yoke assembly.

A device is any apparatus which incorporates a cathode ray tube as part of its implementation.

Digital correction signals are signals that are generated by decoders, such as pulse width modulators, pulse density modulators, digital to analog converters, etc. in response to correction factor data.

A digital monitor board is a circuit board that includes one or more of the following: vertical control circuitry, horizontal control circuitry, electron gun control circuitry, correction and driver circuitry, a logic device, digital to analog converters, and a memory. A digital monitor board may comprise an actual chassis monitor board used with a particular monitor, an ideal chassis board, a chassis board that can be adjusted to match the characteristics or specifications of a particular monitor board, etc.

A digitized signal is any electrical signal that has a digital nature.

A direction can be up, down, left, right, clockwise anti-clockwise, brighter, dimmer, higher, lower, etc..

Discrete locations may be individual pixels on a cathode ray tube screen or may comprise a plurality of pixels on a cathode ray tube screen.

Distortion characteristics are the amount of any particular type of distortion as indicated by the distortion data measured at a number of different points on the cathode ray tube.

Distortion data is a measure of the amount of distortion that exists on a cathode ray tube with regard to the geometry characteristics of the tube, and/or electron gun characteristics of the tube. For example, distortion data can be measured as a result of misalignment of a video image or improper amplitude or gain of a video signal. Distortion data can be a quantitative measure of the deviation of correction factor parameters from a desired quantities value. Distortion data can be measured at coordinate locations on the cathode ray tube.

Driver signals are the electrical signals that are used to drive the deflection and control windings, and electron guns of the cathode ray tube.

Internal to raster is any part or section of a CRT raster as defined by its location on the raster.

Memory can be any desired storage medium including, but not limited to, EEPROMs, RAM, EPROMs, PROMs, ROMs, magnetic storage, magnetic floppies, bar codes, serial EEPROMs, flash memory, etc.

A non-volatile electronic storage device is an electrical memory device that is capable of storing data that does not require a constant supply of power.

A pattern generator is any type of video generator that is capable of generating a video signal that allows measurement of distortion data.

A processor is a logic device including, but not limited to state machines, micro-processors, etc.

A raster is all or part of the horizontal traces produced on the face of a CRT.

A rotation coil is a coil or winding used to rotate the raster in a CRT.

Rotational distortion characteristics are the amount of rotational distortion as indicated by the rotational distortion data measured at a number of different points on a cathode ray tube.

Rotational distortion data is a measure of the amount of rotational distortion that exists on a specific cathode ray tube with regard to the geometry characteristics of the tube. For example, rotational distortion data can be a result of mis-alignment of a video image on the face of the CRT. Rotational distortion data can be a quantitative measure of the deviation of rotational correction factor data from a desired quantitative value. Rotational distortion data can be measured at coordinate locations on the cathode ray tube.

Rotation driver signals are time dependent analog signals generated, by various methods, and applied synchronously to the CRT rotation coil to dynamically align traces of the CRT raster display.

A storage disk may include any type of storage device for storing data including magnetic storage devices such as floppy disks, optical storage devices, magnetic tape storage devices, magneto-optical storage devices, compact disks, etc.

A Variable Resistor is an apparatus capable of producing a changeable value of electrical resistance.

A video image is the displayed image that appears on the cathode ray tube screen that is produced in response to a video signal.

A video pattern is the video image of a pattern that appears on the cathode ray tube raster as a result of the video signal generated by the pattern generator.

A video signal is the electronic signal that is input to the electron guns of the cathode ray tube.

3. Description of Related Art

Almost all TVs in use today rely on a device known as the cathode ray tube, or CRT, to display their images. In order to display an image on the entire screen, electronic circuits inside the TV use magnetic deflection coils (a horizontal deflection coil to move the beam from left to right and a vertical deflection coil to move the beam up and down) to move the electron beam in a "raster scan" pattern across and down the screen. FIG. 1 illustrates a raster 100 on a conventional cathode ray tube where an electron beam paints one line across the screen from left to right 102*a* and then quickly moves back to the left side 104, and paints another horizontal line 102*b*, while continuously moving down slightly. When the beam reaches the right side of the bottom line 107, it is moved back to the upper left corner of the screen, as represented by line 106. When the beam is "painting" lines 102 it is on, and when it is "retracing" lines 104, it is off so that it does not leave a trail on the screen. The term horizontal retrace is used to refer to the beam moving back to the left at the end of each line, while the term vertical retrace refers to its movement from the bottom to the top of the raster 106.

However, in what is referred to as a sinusoidal or "zig-zag" raster scan, there is no horizontal retrace (or flyback) since the image is painted both when the beam scans both left to right as well as right to left as shown in FIG. 2A. Ideally, for example, the electron beam paints a line 202 going from left to right and steps down an interval "d" and paints a next line 204 going from right to left. Unfortunately, conventional vertical amplifiers only produce a linearly changing magnetic flux in the vertical deflection coil, the resulting zig-zag raster is more like that shown in FIG. 2B, exhibiting a distorted raster when compared to the ideal raster scan of FIG. 2A.

Prior art has proposed a solution to make the scan lines parallel by using a wide bandwidth vertical amplifier driven with a stair stepped drive waveform to move the beam down the screen only during the time "d" (now the new horizontal blanking time) between the end of line 202 and the beginning of line 204. These approaches have proved, due in part to the high inductance of the vertical yoke, to be expensive, slow (requiring long horizontal blanking times), power hungry and unstable (producing vertical ringing at the beginning of the lines).

However a vastly simpler solution presents itself, when this downward tilting of each line is characterized as simple scan line rotational distortion.

SUMMARY OF INVENTION

According to the present invention, a method and apparatus for dynamically generating a rotational magnetic flux on a line by line basis in a cathode ray tube is described.

In an embodiment of the invention, a rotation coil is added to the deflection yoke assembly on a cathode ray tube. Accordingly, magnetic flux generated by this rotation or Line Twist Coil (LTC) is set going in the left to right direction but switches polarity when going from the right to left direction. It is this reverse twister flux that combines with the vertical deflection flux to step the scan line. Therefore, the LTC produces an additional flux field combining with the linear vertical flux field to produce the stepped line effect.

In one aspect of the invention, the LTC is a low inductance coil that can be driven by a line frequency signal in order to provide the desired dynamic compensation on a line by line basis.

In another aspect of the invention, the LTC can be incorporated directly into the deflection yoke, or otherwise closely coupled thereto.

In another embodiment of the invention, a method for dynamically compensating for the magnetic flux generated by the vertical deflection coil on a line by line basis in a zig-zag raster type cathode ray tube is described. A twister coil produces a counter flux field to the linear vertical flux field produced by a vertical deflection coil to produce a stepped line raster pattern.

In one aspect of the invention, a first varied magnetic flux is generated by a LTC when a raster scan is going in the left to right direction. When the raster scan goes form the right to the left direction, a second varied magnetic flux is generated by the LTC that combines with a vertical deflection flux to straighten the scan lines.

DETAILED DESCRIPTION OF SELECTED EMBODIMENTS OF THE INVENTION

Reference will now be made in detail to a particular embodiment of the invention, an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

The description herein details selected embodiments of the invention directed at providing a method and apparatus for dynamically compensating the magnetic flux generated by the vertical deflection coil on a line by line basis. In one embodiment, a Line Twister Coil is used to dynamically compensate for the magnetic flux generated by the vertical deflection coil on a line by line basis in a zig-zag raster type cathode ray tube. Accordingly, magnetic flux generated by the Line Twister Coil is set going in the left to right direction but switches polarity when going from the right to left direction. It is this reverse twister flux that combines with the vertical deflection flux to straighten out each scan line. Therefore, the Line Twister Coil produces a flux field combined with the linear vertical flux field resulting in a stepped line effect. In some cases, the Line Twister Coil is a low inductance rotation coil driven by a line frequency signal in order to provide the desired dynamic compensation on a line by line basis. In addition, the Line Twister Coil can be incorporated directly with the vertical deflection coil, or otherwise closely coupled thereto.

Figure 1:
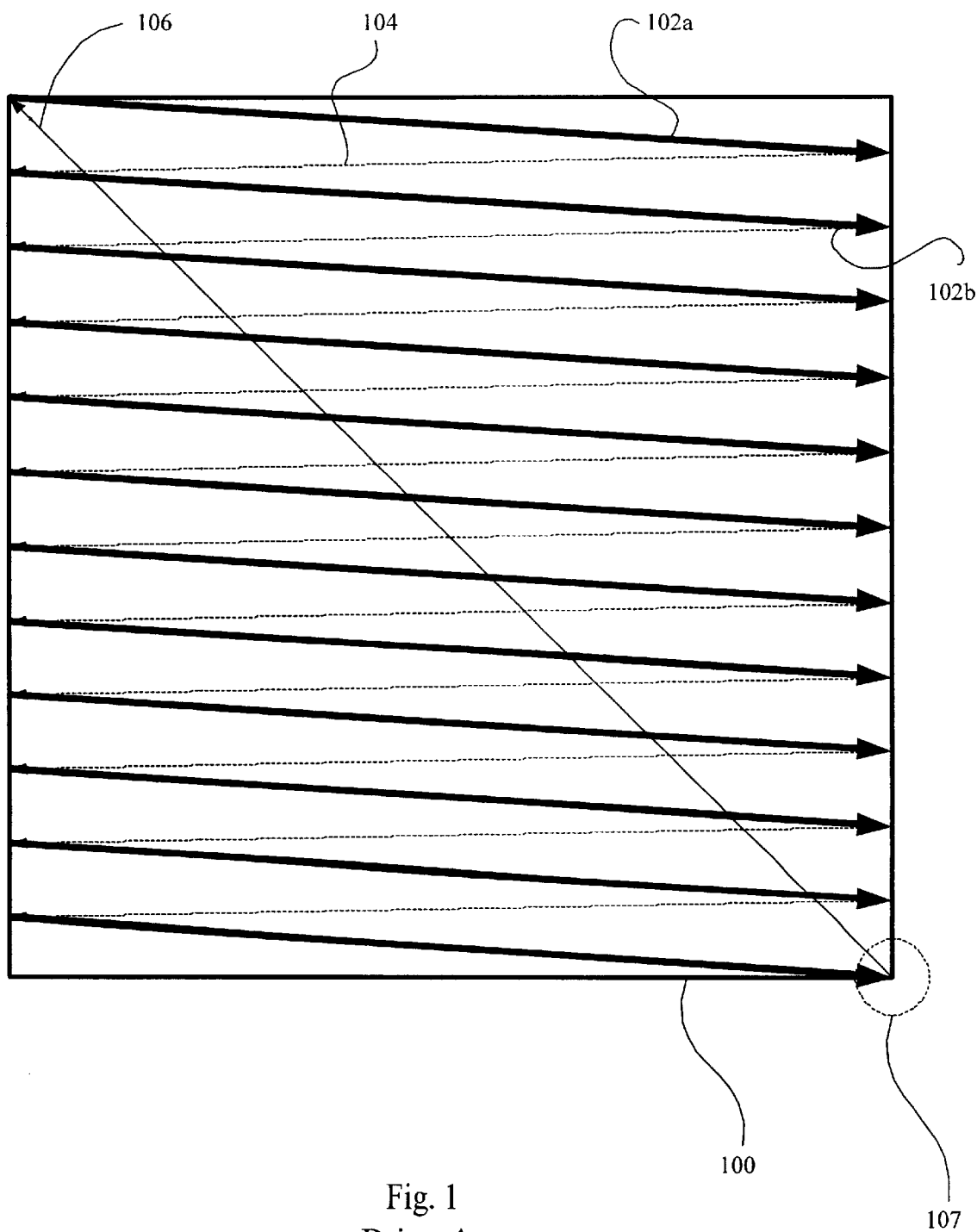
FIG. 1 shows a conventional raster scan suitable for a conventional cathode ray tube (CRT).
Figure 2A:
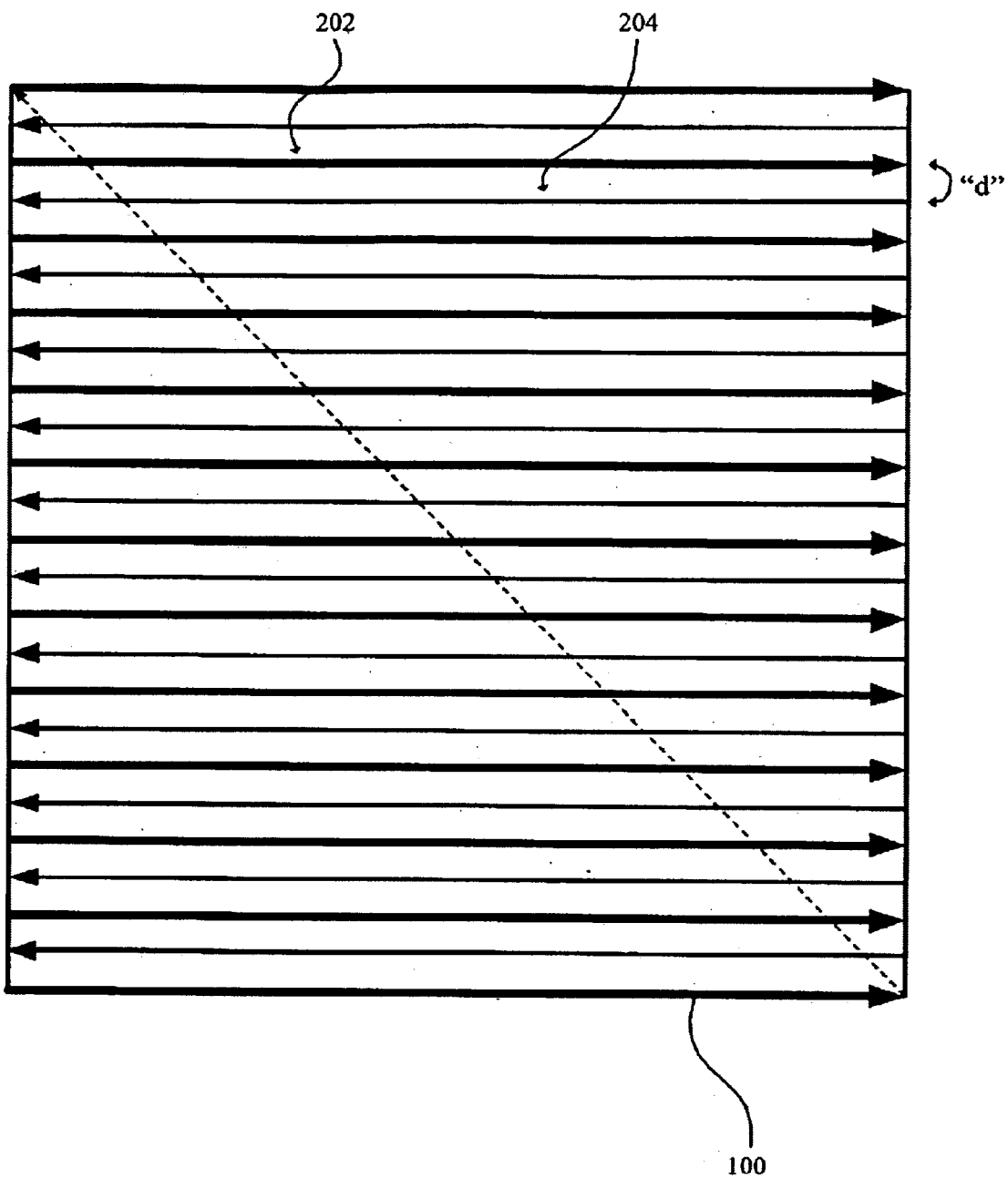
FIG. 2A shows an ideal zig-zag type raster scan.
Figure 2B:
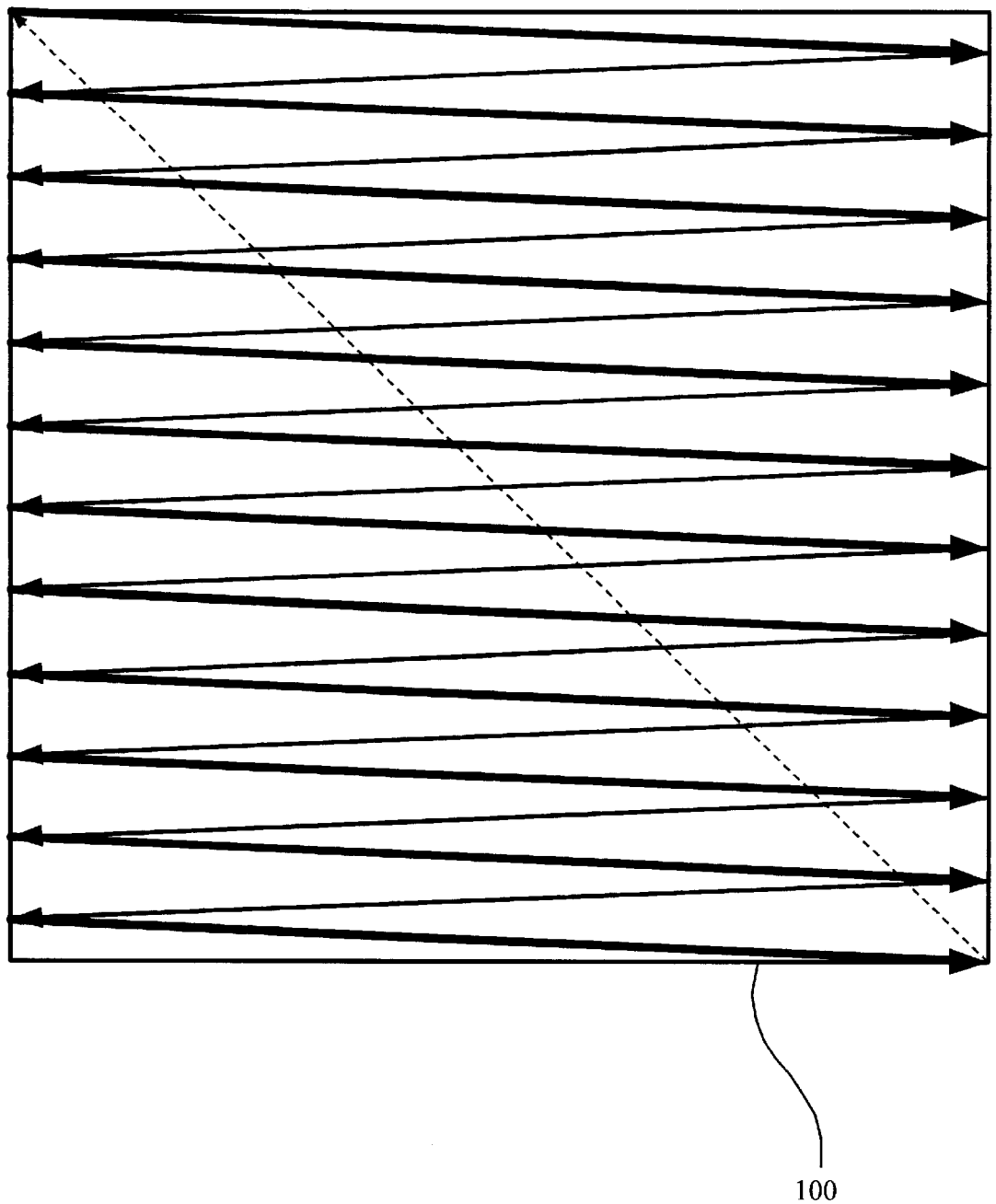
FIG. 2B shows rotational distortion of the ideal zig-zag raster of FIG. 2A due to linearly changing magnetic flux generated by the vertical deflection coil.
Figure 3:
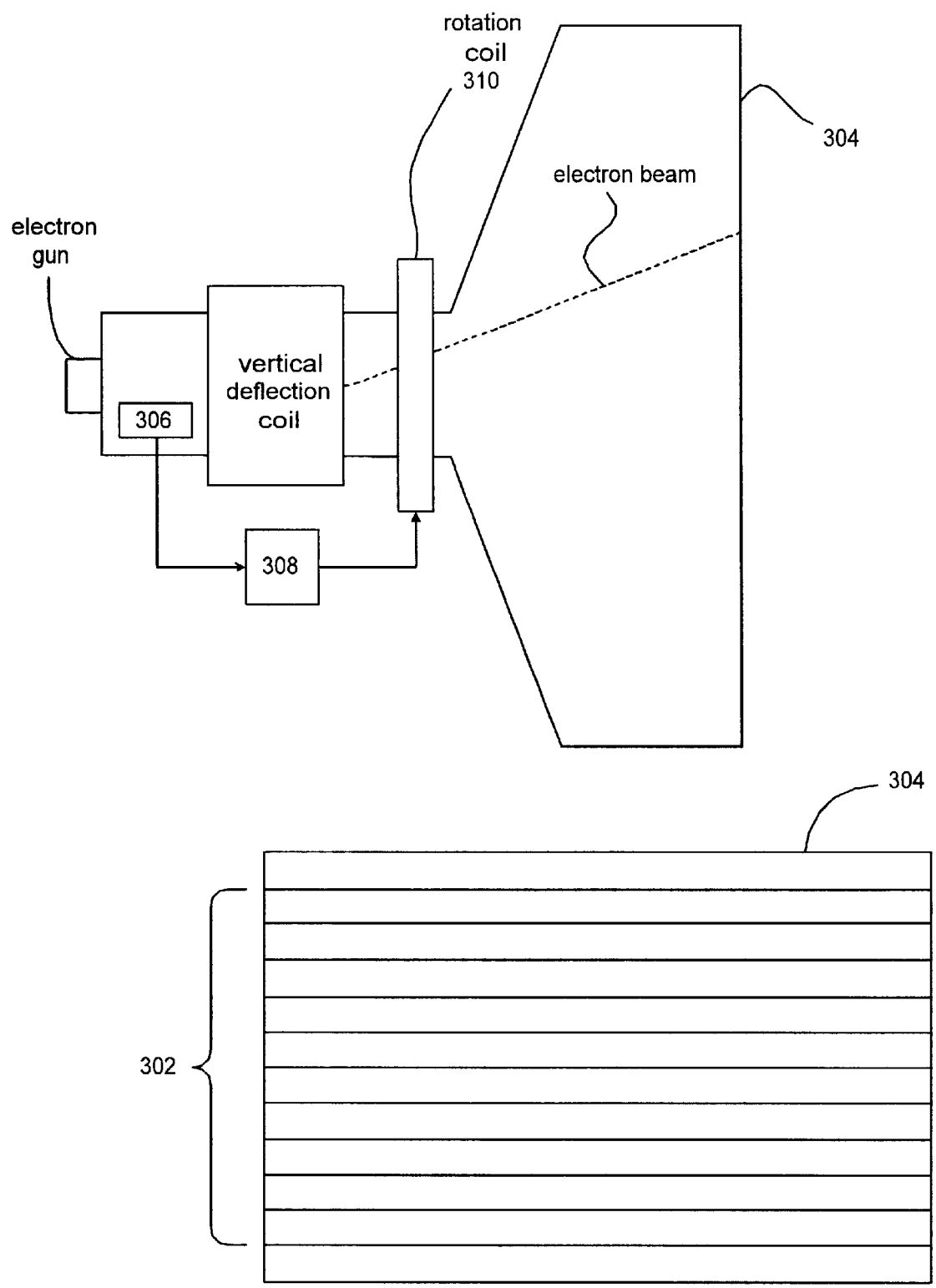
FIG. 3 is a schematic illustration of a raster displayed upon a cathode ray tube (CRT), the CRT rotation coil, and associated signal correction circuitry.

FIG. 3 discloses a cathode ray tube (CRT) 300 having a raster 302 displayed on a screen face 304 of the CRT 300. Numerous and complex interrelationships exist between various horizontal and vertical correction factor parameters (scan geometries) in cathode ray tube image displays and these relationships can be measured and characterized by correction factor data to automate CRT video image alignment. Such correction factor data can be derived as disclosed in U.S. Pat. No. 5,216,204 issued to James R. Webb, et al., entitled "Automatic Precision Video Alignment System" that describes the use of a vision system to measure CRT distortion characteristics and is specifically incorporated herein for all it discloses and teaches. When distortion data is obtained (from, for example, a vision system or derived from a gain matrix table) it is stored as correction factor data in a memory associated with the CRT (e.g., characterization module 306, et.) or in the device monitor board circuitry or other location for later retrieval. This correction factor data is then used by device circuitry to generate and apply driver signals as disclosed by and U.S. Pat. No. 6,014,168 filed Apr. 26, 1996 by James R. Webb, et al., entitled "Screen Mapping of a Cathode Ray Tube" and U.S. Pat. No. 5,825,414 filed Jan. 16, 1996 by james R. Webb, et al., entitled "Method and Apparatus for Making Corrections in a Video Monitor" which are specifically incorporated herein for all that they disclose and teach. As disclosed herein, these same techniques can be used to store rotational correction factor data in the characterization module 306 that can be mounted on CRT 300 or provided by external circuitry (not shown for sake of simplicity). Typically, rotational correction factor data are transferred to and interpreted by monitor board circuitry 308 to generate rotation driver signals for each section of the CRT 300 for which the rotational correction factor data has been generated. These rotation driver signals vary through one vertical scan cycle as CRT raster 302 is generated resulting in a rotation driver signal that is a waveform that changes as the CRT raster is scanned. This time variable rotation driver signal generated by the monitor board circuitry 308 in response to the rotational correction factor data is then synchronously applied to a CRT rotation coil 310 to dynamically align CRT raster 302.

Figure 4A:
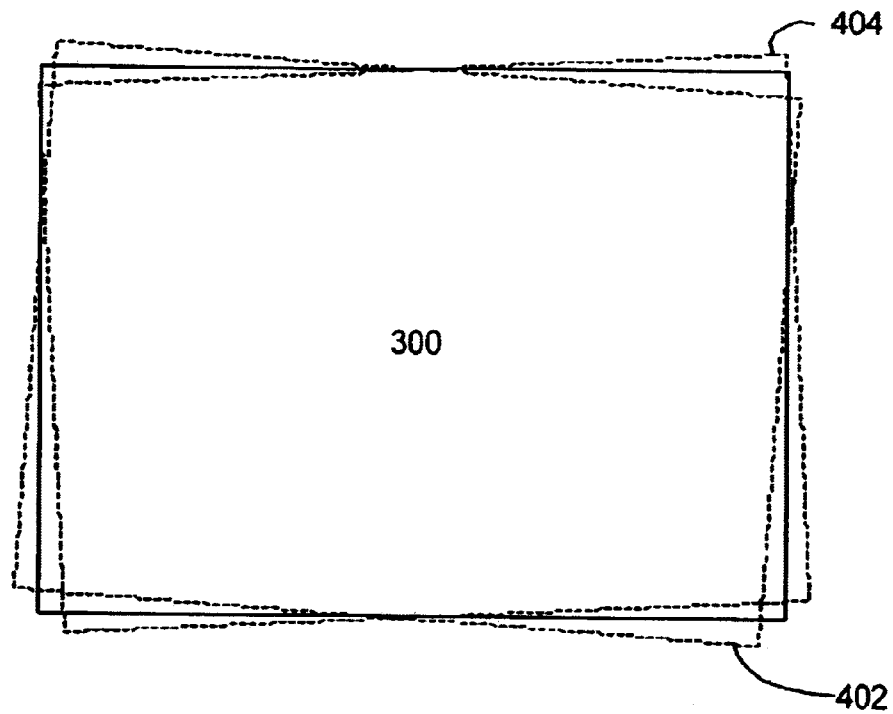
FIG. 4A is a schematic illustration of uniform rotation of an entire raster.
Figure 4B:
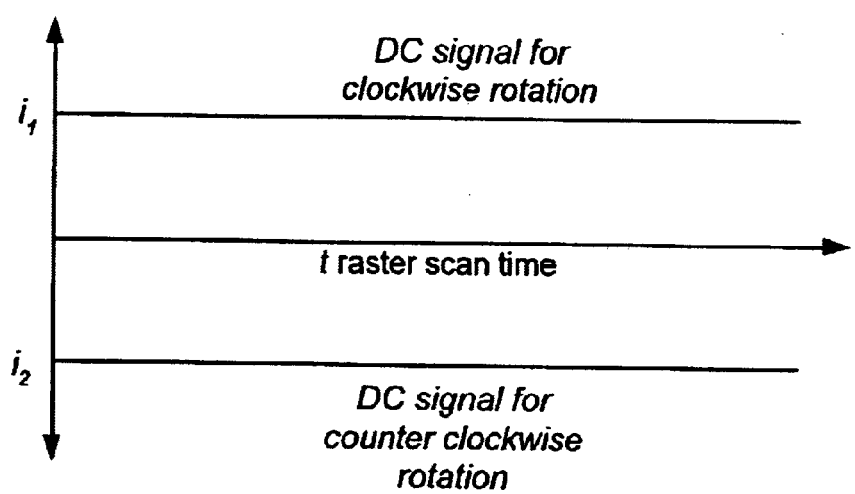
FIG. 4B is a graphical representation of vertical rate signals applied to the rotation coil.

Accordingly, the CRT raster 302 can be statically rotated clockwise or counter-clockwise as shown in FIG. 4A as rasters 402 and 404, respectively using the rotation coil 310 by applying a non-time variable (DC) signals ($i_1$ and $i_2$) illustrated in FIG. 4B to the CRT rotation coil 310. This static method of raster rotation is limited in its usefulness as it does not address distortion internal to the CRT raster. For example, if the top and bottom traces of raster 302 are not parallel to one another, this static method of rotation offers no method of correcting internal alignment of the raster.

Accordingly, FIGS. 5 through 10 illustrate that any trace of a CRT raster scanned during a finite time can be rotated as necessary by the synchronous application of the required time variable correction signal to a CRT rotation coil.

Figure 5A:
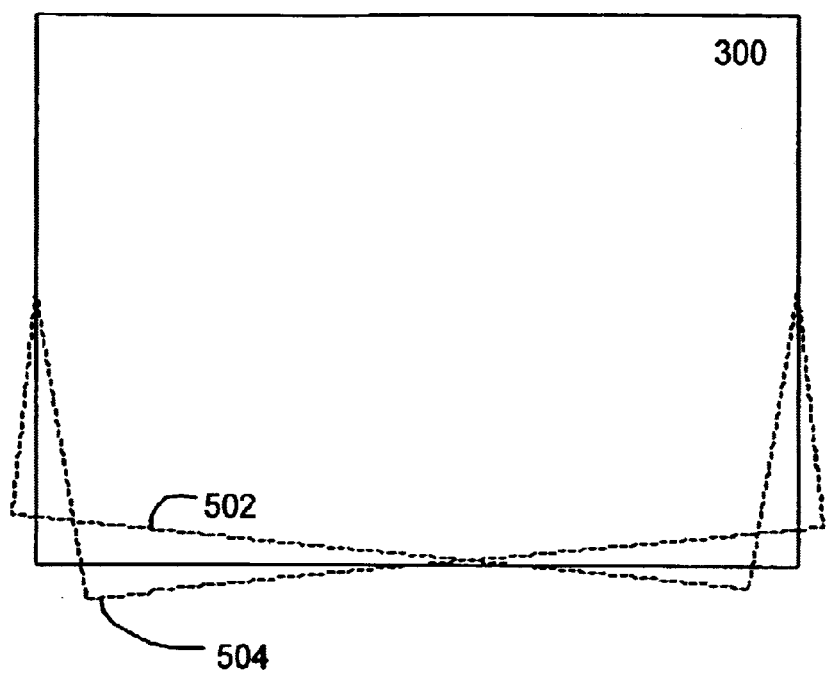
FIG. 5A schematically illustrates the manner to independently rotate the bottom half of a CRT raster.
Figure 5B:
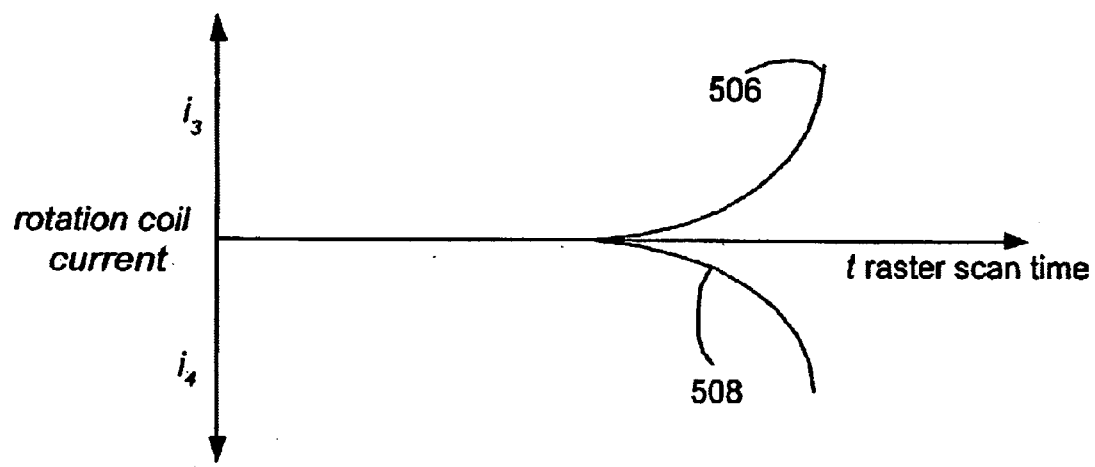
FIG. 5B is a graphical representation of a typical time variable rotation driver signal applied synchronously to independently rotate the bottom of the CRT raster.
Figure 6A:
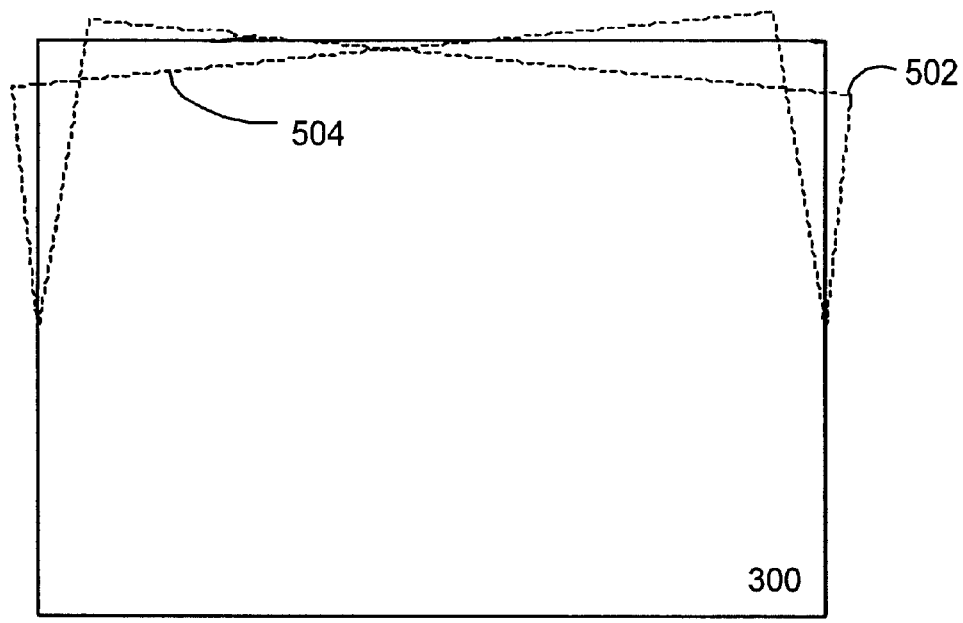
FIG. 6A schematically illustrates the manner in which the present invention can be used to independently rotate the top half of a CRT raster.
Figure 6B:
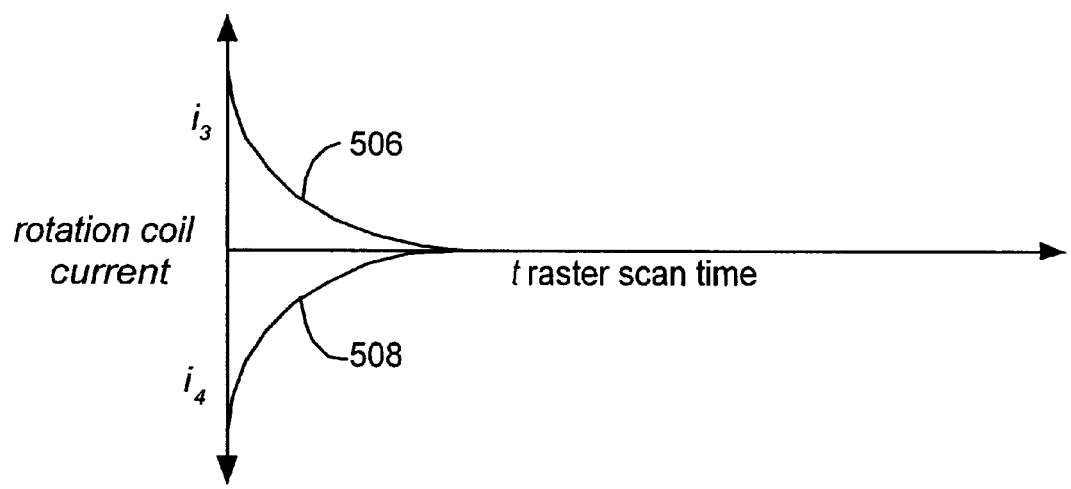
FIG. 6B is a graphical representation of a typical time variable rotation driver signal as applied synchronously to independently rotate the top half of a CRT raster as depicted in FIG. 6A.

FIG. 5A discloses the manner in which the bottom half of a raster 302 can be rotated either clockwise 502 or anti-clockwise 504 by the application of time variable rotation driver signals 506 and 508, respectively, as shown in FIG. 5B. The time variable rotation driver signals 506 and 508 begin at zero magnitude and have no effect until mid-way through the vertical scan of the CRT. At this time, the time variable rotation driver signals 506 and 508 increase in magnitude smoothly until the end of scan or the bottom of the raster is reached. In this manner signal 506 will rotate the bottom half of raster 302 clockwise when applied to the CRT rotation coil. Likewise, signal 508 will rotate the bottom half of raster 302 anti-clockwise when applied to the CRT rotation coil 310. Similarly, FIGS. 6A and 6B discloses a method for rotating the top half of the raster 302 either anti-clockwise 602 or clockwise 604 by the synchronous application of the time variable rotation driver signals 606 and 608, respectively. The time variable rotation driver signals 606 and 608 are at maximum magnitude at the start of the raster scan and smoothly change to zero at the midpoint of the raster. In this manner the rotation driver signal 606 when applied to the CRT rotation coil rotates the top half of raster 302 clockwise and rotation driver signal 608 rotates the top half of raster 302 anti-clockwise when applied to the CRT rotation coil 310.

Figure 7A:
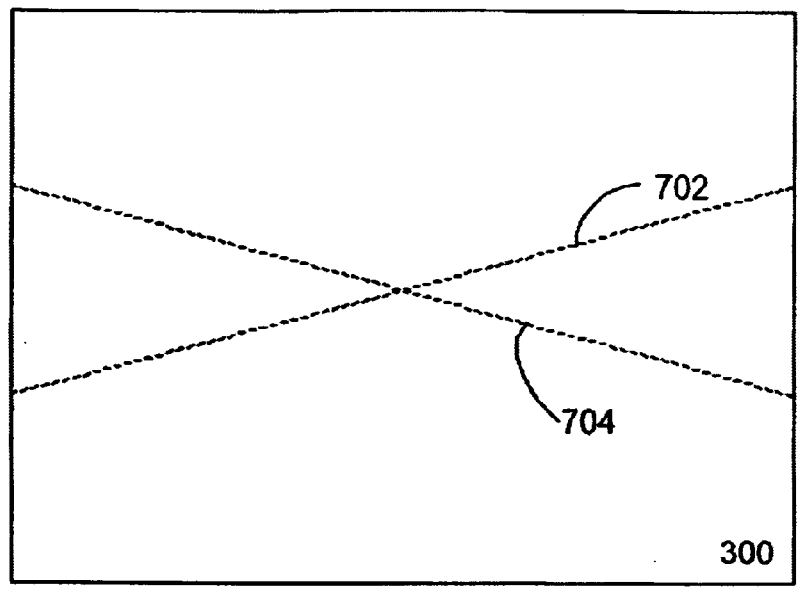
FIG. 7A schematically illustrates the manner in which the present invention can be used to independently rotate the center of a CRT raster.
Figure 7B:
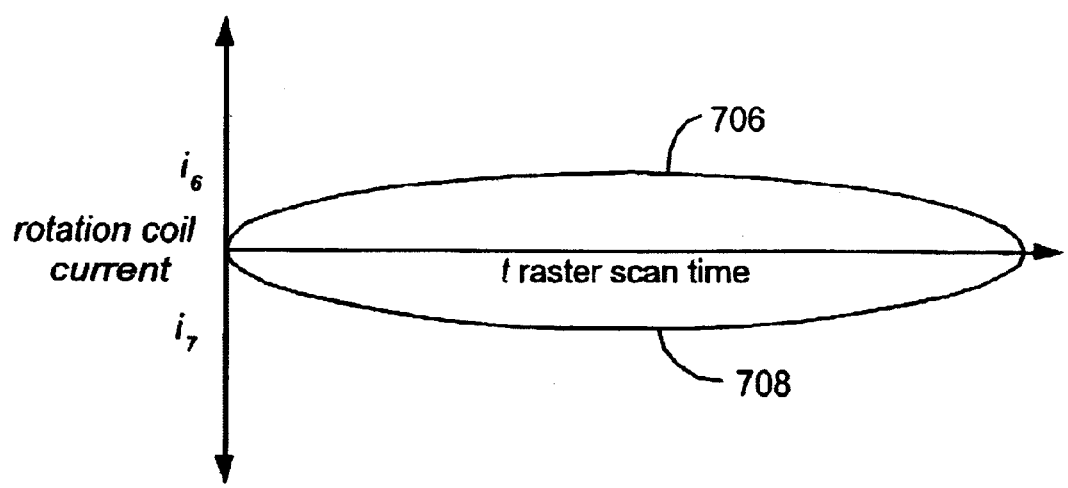
FIG. 7B is a graphical representation of a typical time variable rotation driver signal as applied synchronously to independently rotate the center of a CRT raster, as depicted in FIG. 7B.

FIGS. 7A and 7B discloses a technique utilized in U.S. Pat. No. 5,896,170 may also be used to rotate the center of the CRT raster 302 either in an anti-clockwise direction 704 or a clockwise direction 702 by the application of the time variable rotation driver signals 706 and 708, respectively, as shown in FIG. 7B. The time variable rotation driver signals 706 and 708 begin and end at zero magnitude and are at maximum magnitude at the midpoint of the CRT raster scan. In this way the rotation driver signal 706 when applied to the CRT rotation coil rotates the midsection of raster 302 clockwise and rotation driver signal 708 rotates the midsection of raster 302 anti-clockwise when applied to the CRT rotation coil.

Although the above described methodologies and apparatuses are useful in correcting rotational distortions evident in conventional CRT displays, none correct line curvature distortion of the image on a line by line basis as does the invention. Accordingly, the invention will now be described in terms of a video system that utilizes a cathode ray tube suitable for use in a video display system, such as, for example, a television system well known to those skilled in the arts. Although described in terms of a television system, it should be noted that the invention can be used in any raster based video display system.

Figure 8:
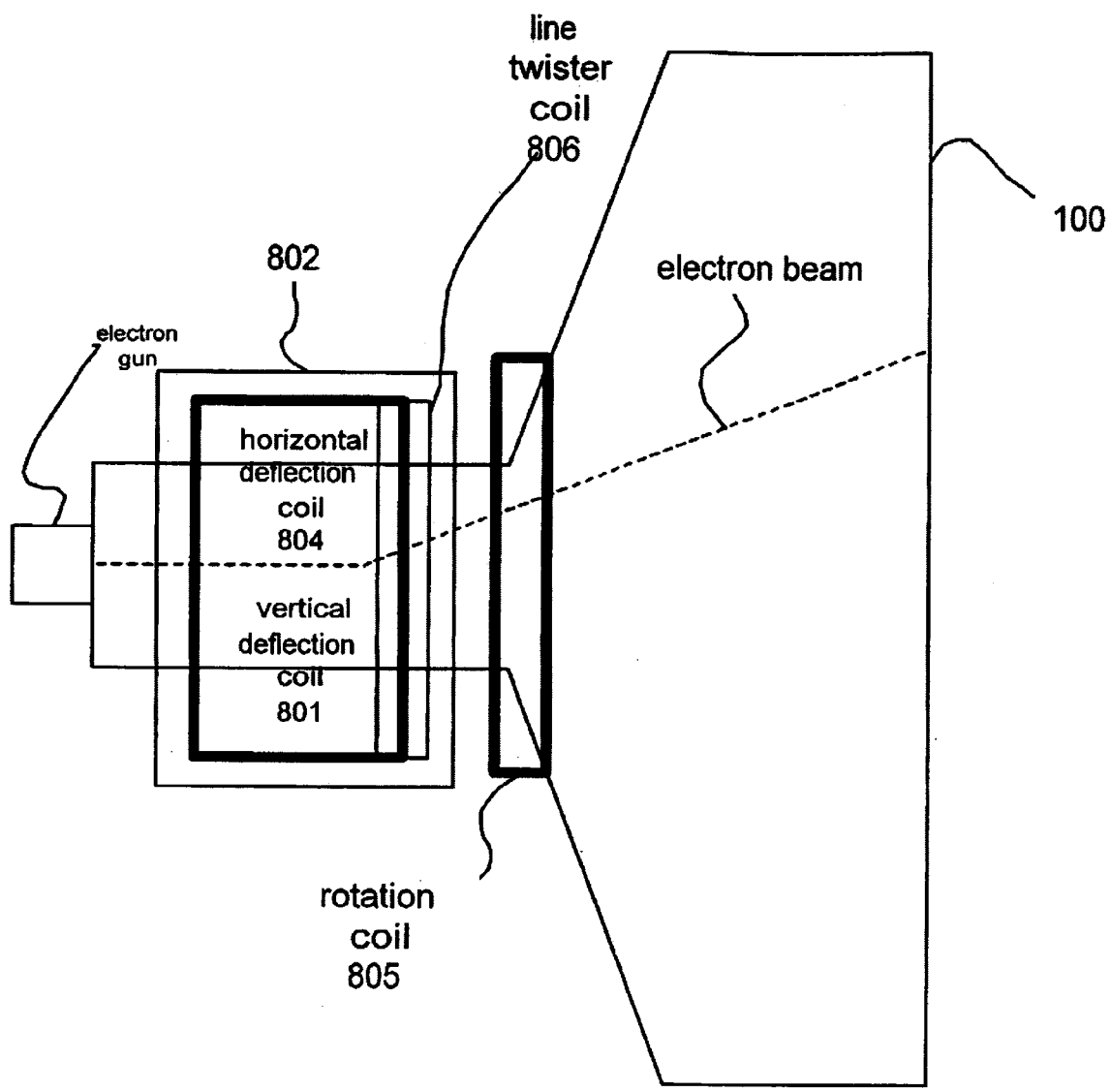
FIG. 8 schematically illustrates the manner in which the present invention can be configured to align a typically distorted CRT raster.
Figure 9:
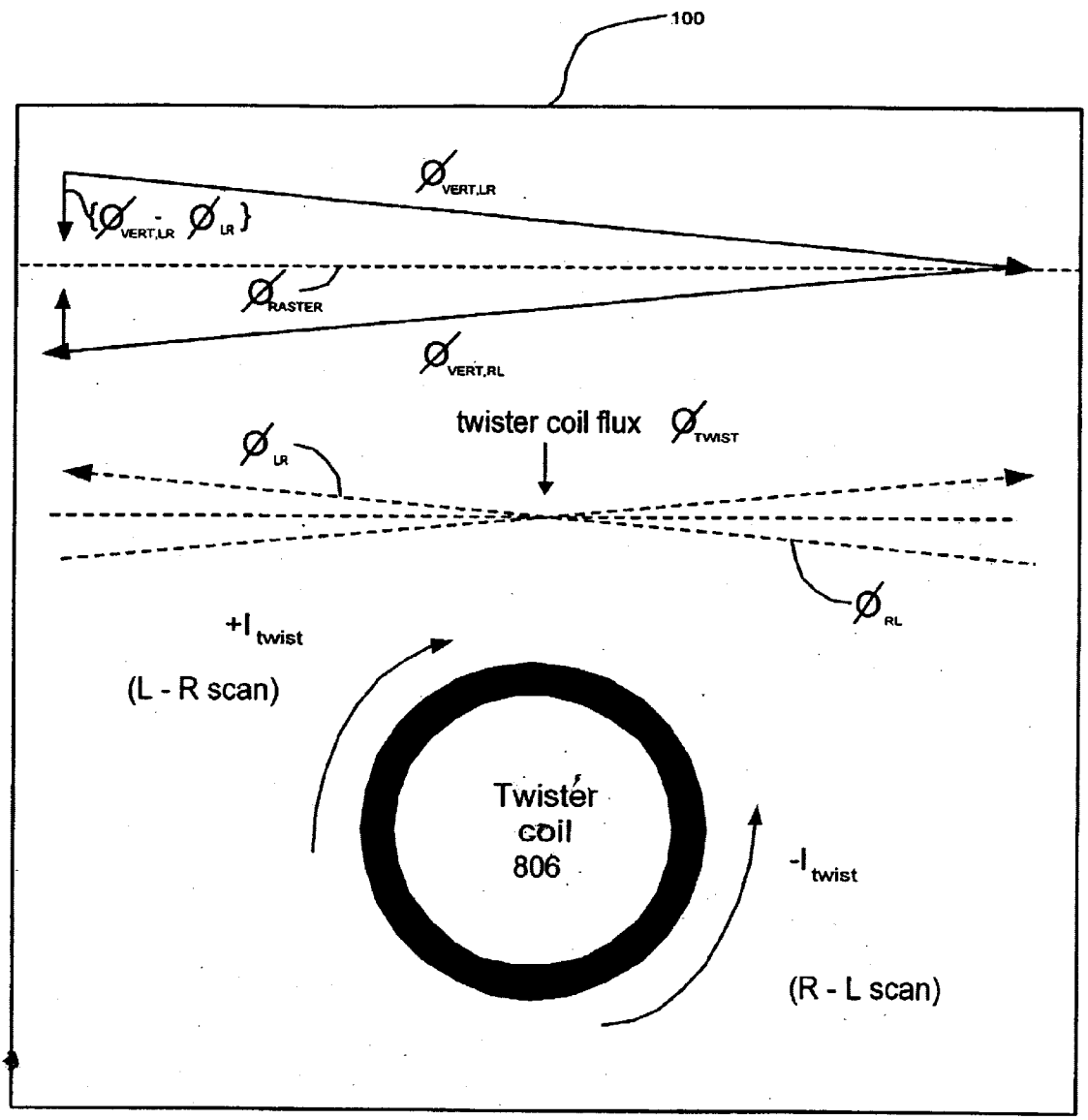
FIG. 9 is a graphical representation of the rotational effect of the flux from the Line Twist Coil.
Figure 10:
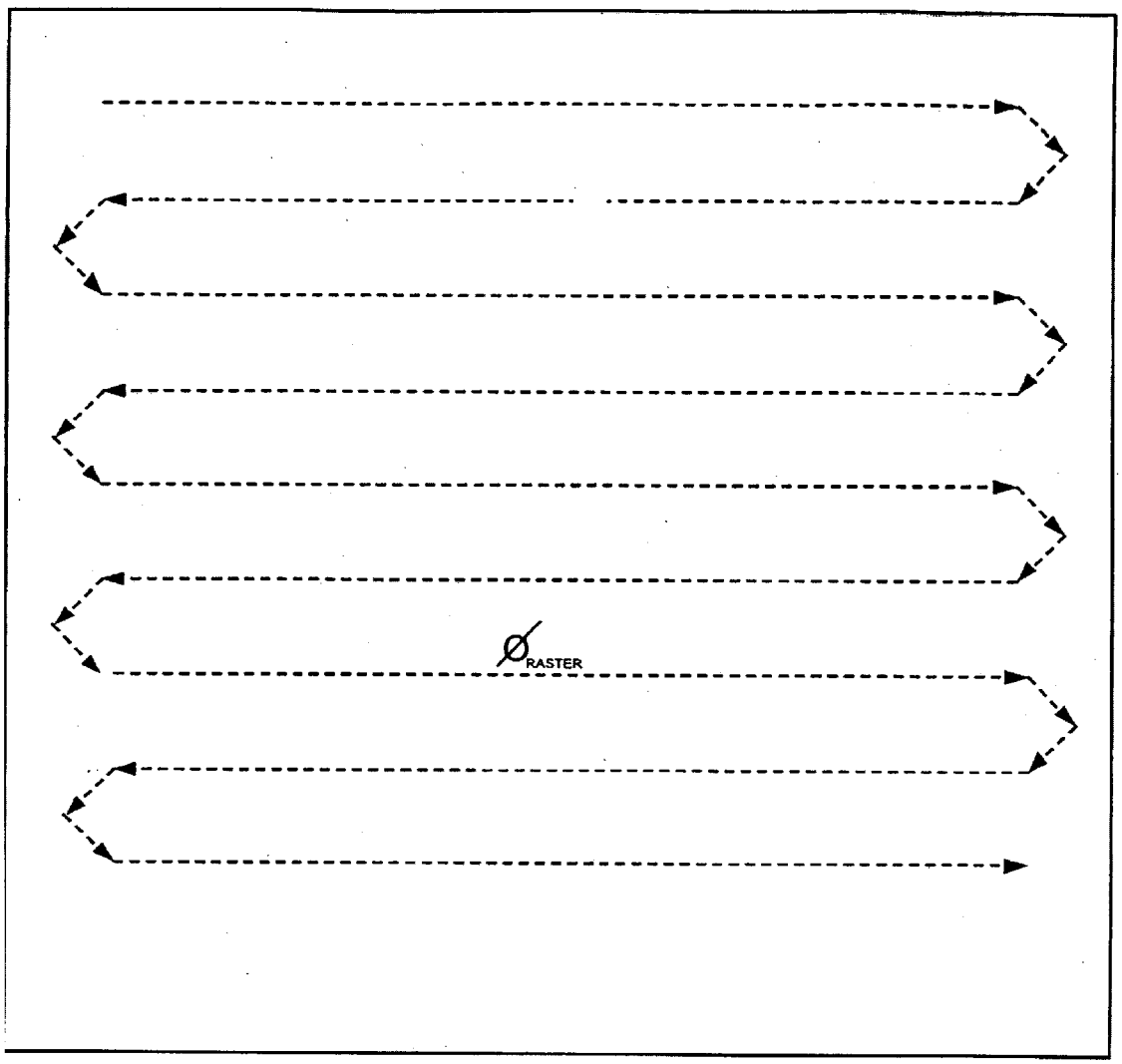
FIG. 10 is a graphical representation of the resulting raster.

In one embodiment of the invention as shown in FIG. 8, a CRT 800 includes a Deflection Yoke 802 incorporating a vertical deflection coil 801 a horizontal deflection coil 804 and a closely coupled Line Twister Coil 806 that is used to compensate for the raster rotational distortion of the horizontal scan line 102 primarily caused by the effects of the magnetic flux $\phi_{VERT}$ generated by the vertical deflection coil 801. In the described embodiment, the LTC 806 incorporated directly with the horizontal deflection coil 804, or otherwise closely coupled thereto thereby taking the form of a self powered twister coil 806. By being placed on or in proximate location to the horizontal deflection coil 804, the self powered twister coil 806 receives the requisite power to provide the twister magnetic flux by the magnetic coupling with the horizontal deflection coil flux.

In described embodiment, the twister coil 806 is arranged to provide a counter flux field to the linear vertical flux field produced by the vertical deflection coil 804 in order to produce a stepped line effect. This counter flux field, referred to as a twister magnetic flux $\phi_{TWIST}$ (shown in FIG. 9), has a first component $\phi_{LR}$ having a magnitude FV when the raster scans in the left to right direction and a second component $\phi_{RL}$ of opposite polarity (i.e., $\phi_{RL}=-\phi_{LR}$) but substantially the same magnitude FV when the raster scans in the right to left direction (i.e., $abs(\phi_{RL})=abs(\phi_{LR})$). Accordingly, each of the twister flux components ($\phi_{RL}$ and $\phi_{LR}$) combines with a corresponding component of the vertical deflection flux $\phi_{VERT}$ (having left to right component $\phi_{VERT,LR}$ and a right to left component $\phi_{VERT,LR}$) to form a resultant raster flux $\phi_{raster}$ shown in FIG. 10. In particular, during the left to right scan, the first component $\phi_{LR}$ combines with the left to right component $\phi_{VERT,LR}$ while the second component $\phi_{LR}$ combines with the right to left component $\phi_{VERT,RL}$ to form the resultant raster flux $\phi_{raster}$. In general therefore, while the vertical field monotonically increases, the counter flux field (i.e., the twister magnetic flux $\phi_{TWIST}$) provided by Line Twister Coil 806 increases in the reverse direction thereby maintaining the observed line substantially level and free of rotational distortion during the left to right scan. During the return right to left scan, the twister magnetic flux $\phi_{TWIST}$ completely reverses and adds to right to left component $\phi_{VERT,RL}$. Therefore, the resultant flux remains constant for each line, but jumps incrementally at the end of each line providing a "stepped flux" field scan that is substantially free of rotational distortions.

Figure 11:
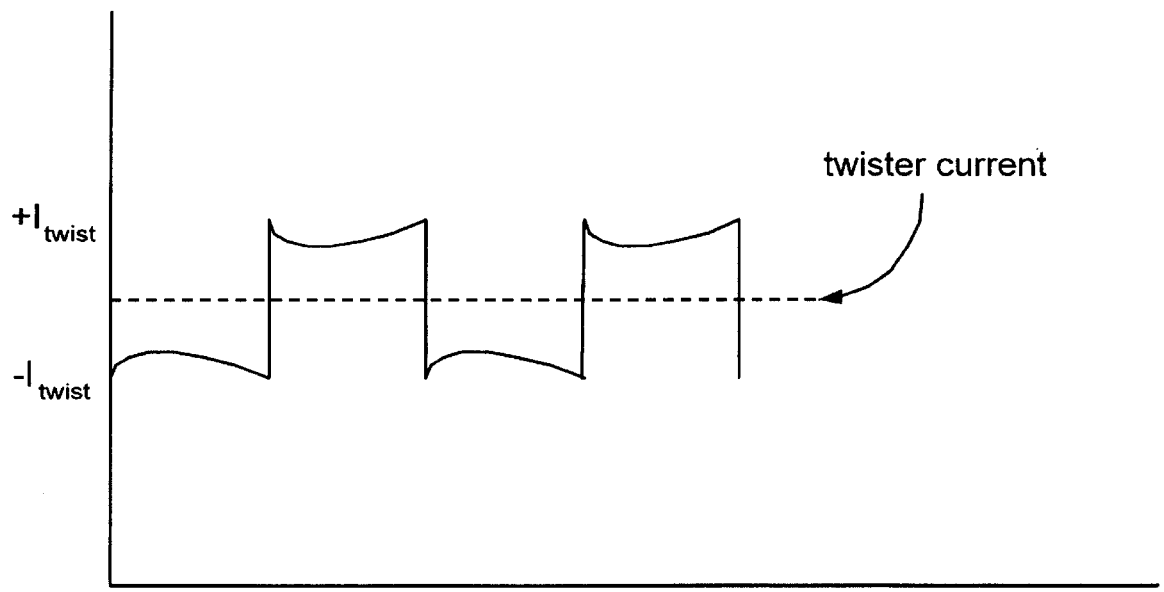
FIG. 11 is a graphical representation of the current in the Line Twist Coil.

In the described embodiment, the Line Twister Coil 806 is typically a low inductance coil (on the order of approximately 500 micro-henries) formed of a few turns (approximately in the range of 30 turns, for example, is typical). This configuration is substantially smaller than a larger rotation coil 805 that typically has a few hundreds of turns and a large inductance of 10 milli-henries or more. In this way, the inventive Line Twister Coil c806 an be driven by a high frequency signal (see FIG. 11) in order to provide the desired dynamic compensation on a line by line basis.

Figure 12:
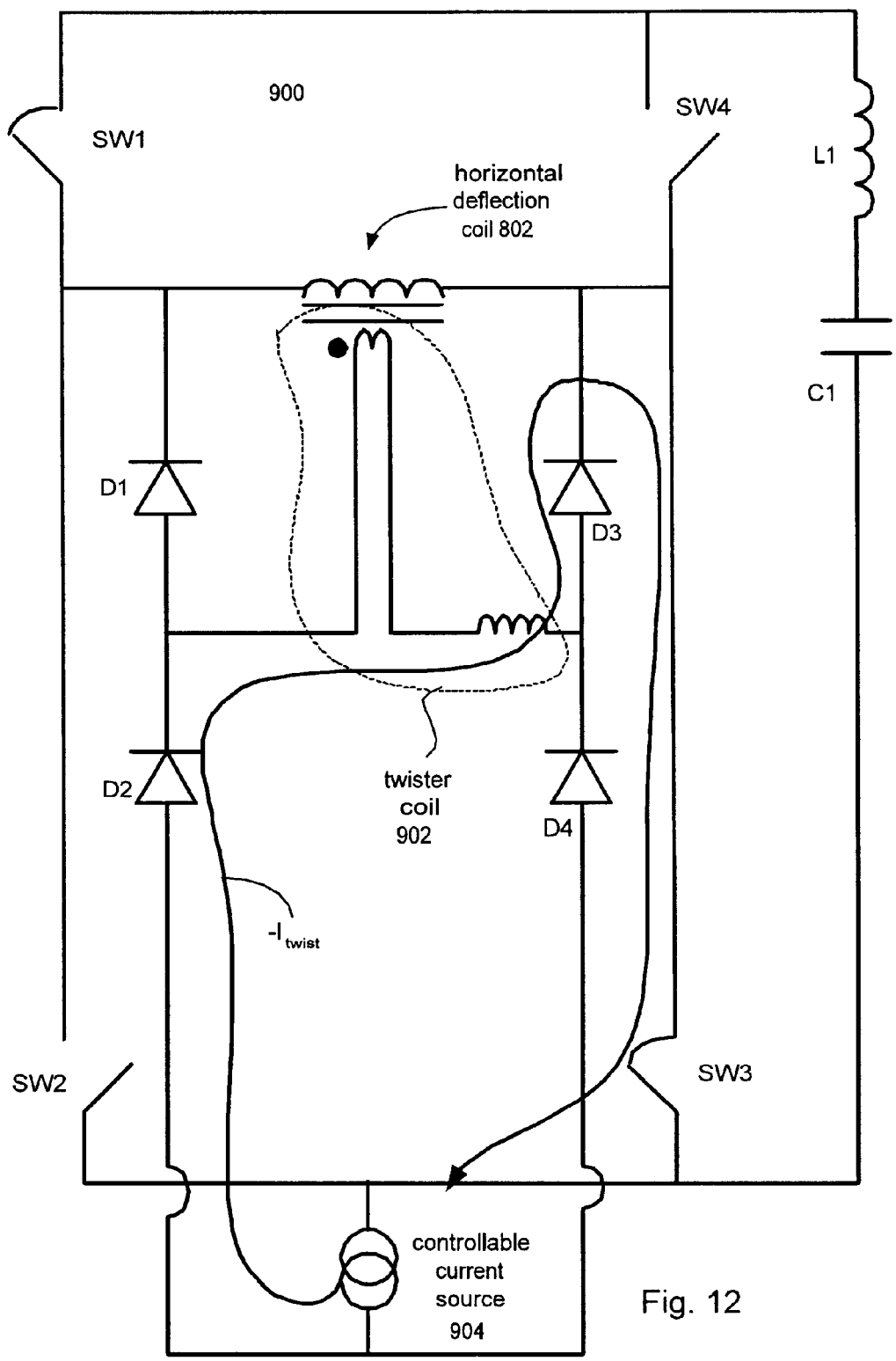
FIG. 12 is the schematic for the first preferred embodiment and the current path when scanning left to right.
Figure 13:
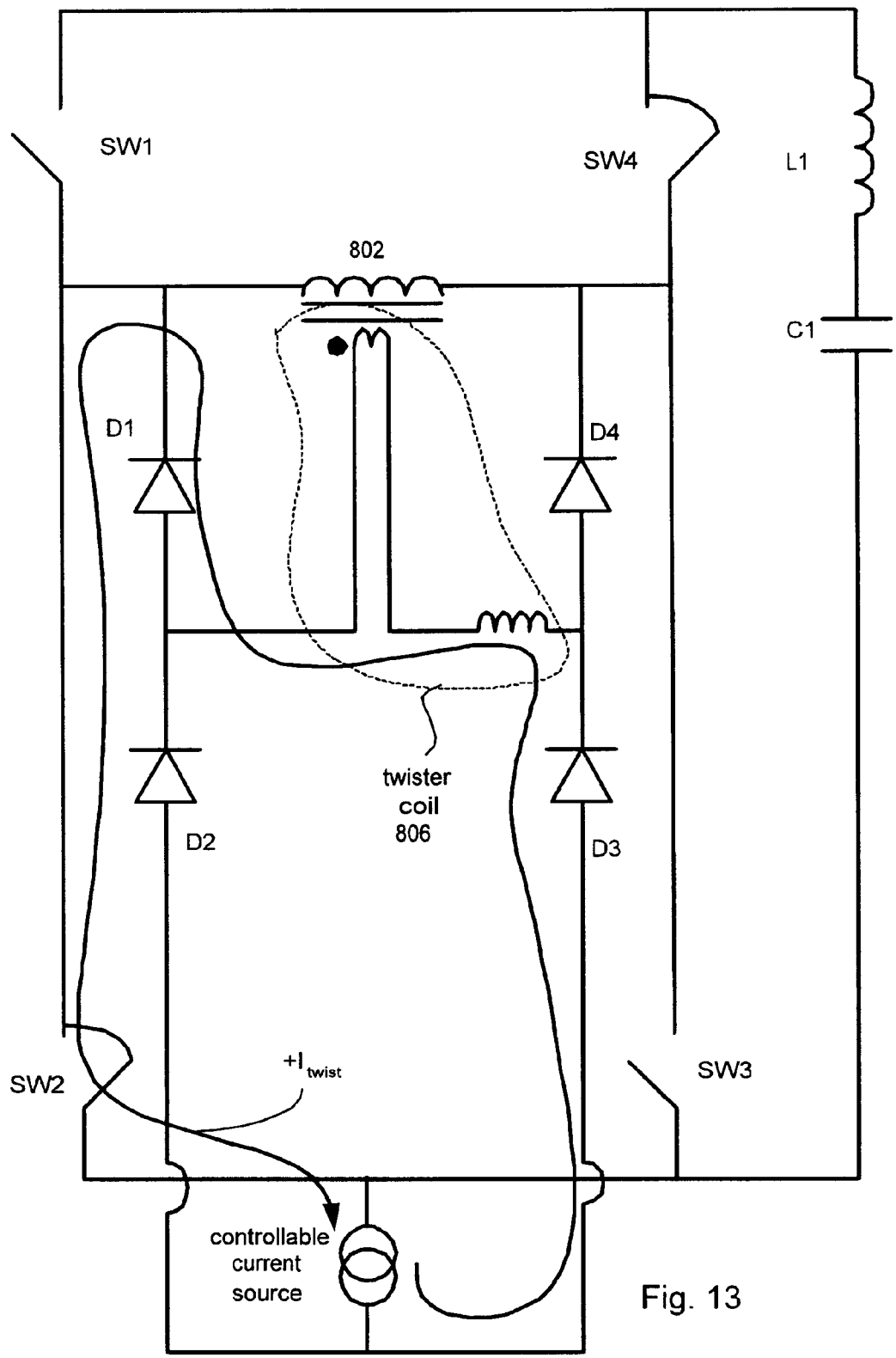
FIG. 13 is the schematic for the first preferred embodiment and the current path when scanning right to left.

FIGS. 12 and 13 illustrate a twister power circuit 900 for implementation of the twister coil 806 in the form of a self powered twister coil 902 wherein the self powered twister coil 902 is magnetically coupled directly with the horizontal deflection coil, or otherwise closely coupled thereto. In the case of the self powered twister coil 902, power to drive the twister coil 902 is derived primarily from the horizontal deflection coil 802 by juxtaposing some turns of the twister coil 902 in close proximity to the horizontal deflection coil 802. In this way, magnetic flux linkages and phase between the magnetic field generated by the horizontal deflection coil 802 and the turns of the twister coil 902 provide the necessary EMF along the lines of a transformer assembly.

In the described embodiment, a controllable current path 904 can be used to change the amount of current in the twister coil 902. In the described embodiment, a first twister current $1_{twist1}$ flows from right to left and then a second twister current $I_{twist2}$ flows left to right. By using power derived from the horizontal deflection coil 804 (the horizontal leakage flux through the twister coil acts as a transformer inducing a voltage across the twister coil) the twister power circuit 900 is self-powered and dynamically controllable in that the amount of current in that twister coil 902 can be controlled with the controllable current path 904. In this arrangement, the twister power circuit 900 combines pulling power out of the horizontal deflection coil 804 to run the twister coil 902 as well as optional electronics to control correction waveforms in the yoke. Accordingly, the circuit 900 utilizes current steering diodes D1 through D4 to rectify the current to the controllable current path as the direction of scan reverses in response to switching elements SW1 through SW4 arranged in such a way as to provide the first twister current $I_{twist1}$ and the second twister current $I_{twist2}$.

Figure 14:
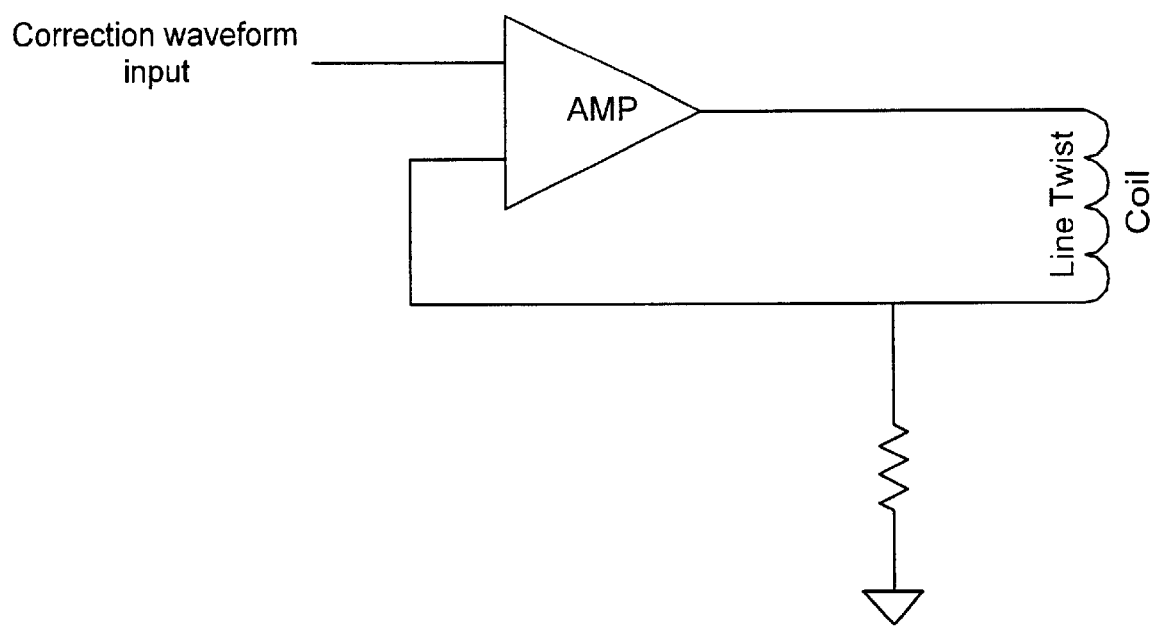
FIG. 14 is the schematic for the second embodiment that can produce currents in either polarity.

FIG. 14 discloses a second embodiment of the invention where an amplifier is used to supply line rotation current of either polarity during the line time.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A method of dynamically correcting, on a line by line basis, rotational distortion of a raster scan in a cathode ray tube, comprising:

during a left to right scan, generating a first correction magnetic flux component having a first magnitude and a first polarity;

adding the first correction magnetic flux to a first vertical deflection magnetic flux component in real time;

during a next right to left scan, generating a second correction magnetic flux component having a second magnitude and a second polarity; and generating a resultant vertical deflection magnetic flux by adding the second correction magnetic flux to a second vertical deflection magnetic flux component in real time.

2. A method as recited in claim 1, wherein the first correction magnetic magnitude and the second correction magnetic flux magnitude are approximately equal to each other.

3. A method as recited in claim 1, wherein the first polarity is approximately 180 degrees out of phase from the second polarity.

4. A method as recited in claim 1, wherein the resultant magnetic flux is a substantially free of rotational distortions.

5. A method as recited in claim 1, wherein the resultant magnetic flux is adjusted during the line time to uniformly separate the lines.

6. An apparatus for dynamically correcting, on a line by line basis, rotational distortion of a raster scan in a cathode ray tube having a deflection yoke, containing a vertical deflection coil, and a horizontal deflection coil, further comprising:

a twister coil coupled to the yoke arranged to provide, during a left to right scan, a first correction magnetic flux component having a first magnitude and a first polarity, during a next right to left scan, a second correction magnetic flux component having a second magnitude and a second polarity, wherein a resultant vertical deflection magnetic flux is provided by adding the second correction magnetic flux to a second vertical deflection magnetic flux component in real time.

7. An apparatus as recited in claim 6, wherein the twister coil is magnetically linked to the horizontal deflection coil.

8. An apparatus as recited in claim 7, wherein the twister coil is powered by the horizontal deflection coil by way of the magnetic linkage.

9. An apparatus as recited in claim 6, wherein the resultant magnetic flux is a substantially free of rotational distortions.

10. An apparatus as recited in claim 6, wherein the resultant magnetic flux is adjusted during the line time to uniformly separate the lines.

11. A rotational distortion correction circuit arranged to correct rotational distortion in a raster scan displayed on a cathode ray tube (CRT) coupled thereto having a deflection yoke, comprising:

a line twister coil arranged to provide during a left to right scan, a first correction magnetic flux component having a first magnitude and a first polarity, during a next right to left scan, a second correction magnetic flux component having a second magnitude and a second polarity, wherein a resultant vertical deflection magnetic flux is provided by adding the second correction magnetic flux to a second vertical deflection magnetic flux component in real time; and a current amplifier coupled to the line twister coil arranged to provide a controlled current to the line twister coil.

12. A circuit as recited in claim 11, wherein the line twister coil is magnetically coupled to the horizontal deflection coil.

13. A circuit as recited in claim 12, wherein the line twister coil is a self powered line twister coil since the power used to drive the line twister coil is derived substantially all from the purposely magnetically coupled horizontal deflection coil.

14. A circuit as recited in claim 13, wherein the magnetically induced voltage across the line twist coil is rectified by diodes and loaded by a controllable current path to dynamically adjust the resulting flux produced by the line twist coil.

15. A circuit as recited in claim 11, wherein the polarity and current in the line twist coil is adjusted during the line time to produce a flux that uniformly separates the raster lines.

* * * * *